INVENTOR.
Harold E. Warstler

United States Patent Office 3,172,336
Patented Mar. 9, 1965

3,172,336
PILOT-CONTROLLED PNEUMATIC PISTON ACTUATOR
Harold E. Warstler, Bloomington, Ind., assignor to Robertshaw Controls Company, a corporation of Delaware
Filed Oct. 22, 1962, Ser. No. 232,126
7 Claims. (Cl. 91—387)

This invention relates to means for converting a pneumatic signal to linear motion and more particularly, to means comprising a piston actuator having a novel pressure porting and swivel structure, and including a novel pilot positioner.

It is an object of this invention to provide a piston actuator having a novel swivel mounting and a novel pilot positioner whereby the output motion of the said actuator is always proportional to the value of signal pressure irrespective of the load on said actuator.

Another object of this invention is to provide a piston actuator having a novel swivel mounting, wherein said mounting includes integral pressure connections and wherein said pilot positioner is mounted directly on said actuator.

These and other objects of this invention will become more fully apparent with reference to the following specification and drawings which relate to a preferred embodiment of the present invention.

Figure 1:
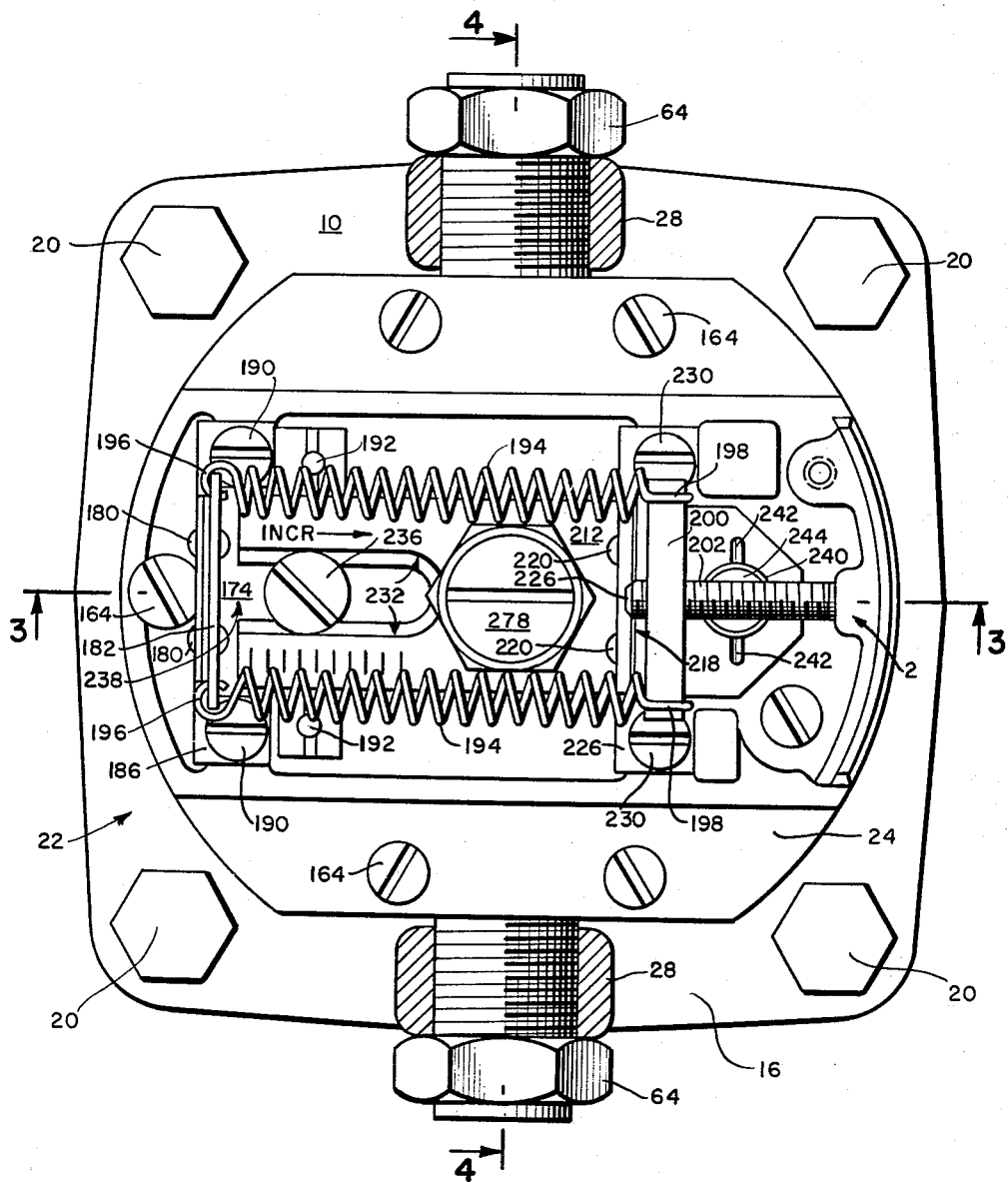
FIGURE 1 is a top plan view of the invention in partial cross-section.
Figures 2, 4:
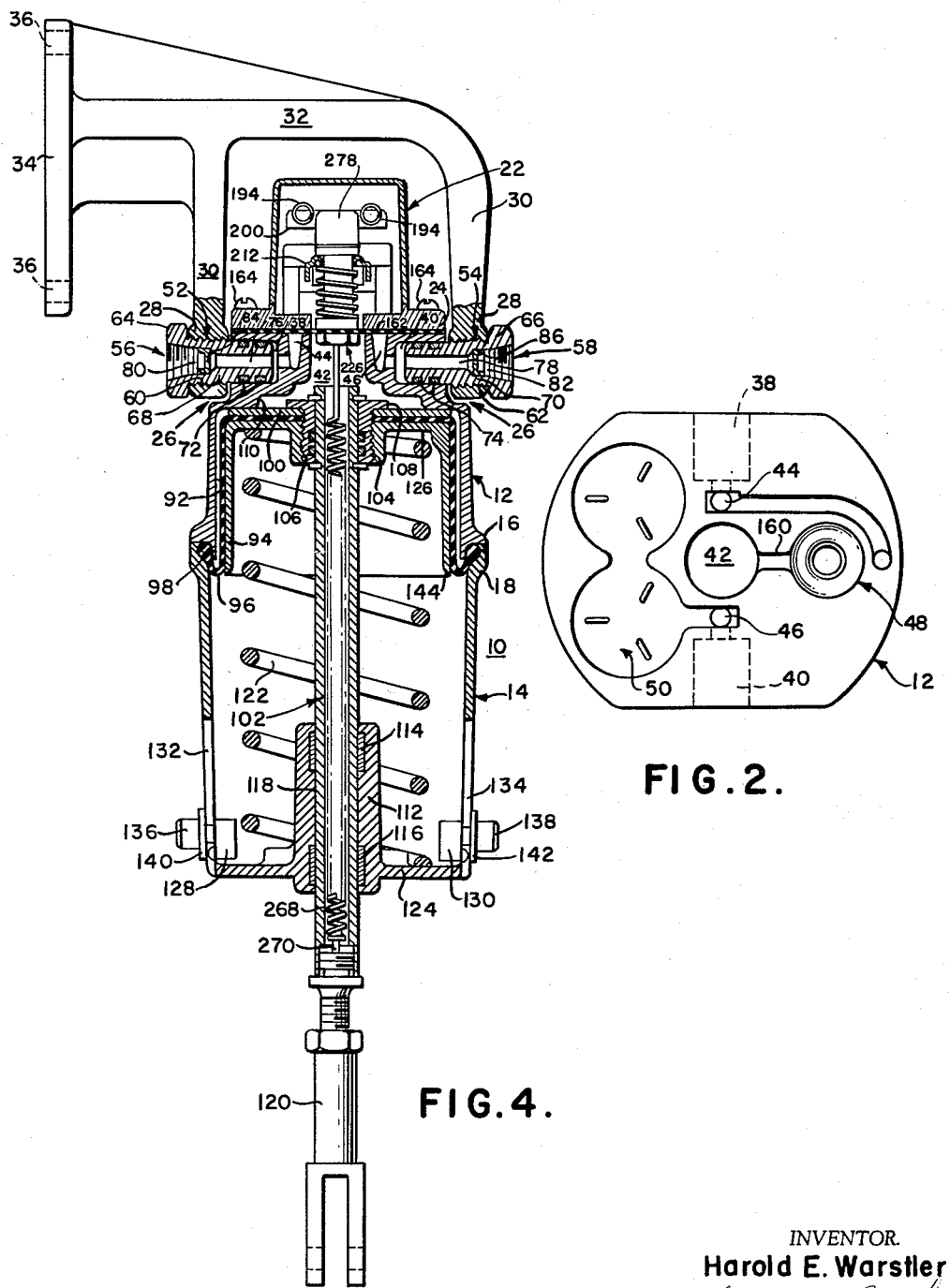
FIGURE 2 is a top plan view of the piston actuator illustrating the integral pressure ports therein.
FIGURE 4 is a full cross-section including the piston actuator and pilot positioner taken along line 4—4 of FIGURE 1.

Referring in detail to the drawings, and more particularly to FIGURES 1 and 4, the piston actuator 10 of the present invention is shown as comprising opposed upper and lower bell housings 12 and 14, respectively, having opposed juxtaposed flanges 16 and 18 secured together by a plurality of peripherally spaced bolts 20.

The pilot positioner, hereinafter referred to as the pilot relay 22, is shown as being mounted on the top of the upper bell housing 12 by means of a chambered pressure plate 24 which acts as the base for the pilot relay 22.

The upper housing 12 and the pressure plate 24 are peripherally recessed at diametrically opposed locations 26 whereby the lower tips 28 of a pair of dependent trunnion arms 30 are located one in each of the said recesses 26 immediately adjacent the upper bell housing 12. The trunnion arms 30 are integral with a cantilever type mounting bracket 32 including a mounting plate 34 which is adapted to be bolted to any suitable support (not shown) via a plurality of bolt holes 36.

Referring also to FIGURE 2, the upper end of the upper housing 12 contains integral flow ports 38, 40 and 42 comprising left and right external and central or internal ports, respectively. The left and right hand external pressure ports 38 and 40 are adapted to be connected to suitable sources of signal pressure including a variable input pressure and a main or supply pressure for operation of the pilot relay 22. For this purpose, each of the external pressure ports 38 and 40 are connected via transfer ports 44 and 46, respectively, to recessed internal pressure chambers 48 and 50 in the said upper housing 12.

The tips 28 of the trunnion arms 30 include coaxially disposed tapped bores 52 and 54 which are adapted to receive first and second trunnions 56 and 58, respectively, on which are provided externally threaded portions 60 and 62. The trunnions 56 and 58 are indexed with respect to the said bores 52 and 54 by means of integral hex-heads 64 and 66, respectively, which are adapted to be turned up, via the threaded portions 60 and 62, respectively, into juxtaposition with the respectively associated tips 28 of the trunnion arms 30.

The first and second trunnions 56 and 58 include smooth cylindrical portions 68 and 70, respectively, which are adapted to fit directly into the left and right hand external pressure ports 38 and 40, respectively. A first and second pair of O-ring seals 72 and 74, respectively, are provided on the cylindrical portions 68 and 70 of the said trunnions, whereby the said upper housing 12 is rotatably journalled on the trunnions 56 and 58 by its external pressure ports 38 and 40, respectively.

The first and second trunnions 56 and 58, respectively, are provided with axial bores 76 and 78 which extend completely therethrough to communicate directly with the said external pressure ports 38 and 40 and provide means whereby external pressure connections may be made with the said external pressure ports 38 and 40. Filter screens 80 and 82 may be placed in counterbored coupling recesses 84 and 86, respectively, in the first and second trunnions 56 and 58, respectively, whereby impurities are prevented from entering the said pressure ports 38 and 40.

The inner wall 92 of the upper bell housing 12 defines a cylinder which houses a hollow conformally shaped piston 94 over which is draped a motor diaphragm 96.

The motor diaphragm 96 has its outer periphery 98 clamped between the flanges 16 and 18 of the upper and lower bell housings 12 and 14, respectively, and is held against the top of the piston 94 by means of a buffer plate 100 which is coextensive with the top of the said piston.

The piston 94 is mounted on a piston rod or actuator output shaft 102 by means of an integral, inwardly extending, internally threaded collar 104 which interacts with an externally threaded bushing 106 fixed on the upper end of the shaft 102. An integral shoulder 108 on the upper end of the bushing 106 is brought into juxtaposition with the buffer plate 100, when the piston 94 is turned-up on the said bushing 106 via the collar 104, to thereby force the buffer plate hard against the motor diaphragm 96 and the top of the piston 94 and positively retain the motor diaphragm in place.

In addition, the buffer plate 100 also serves to prevent the motor diaphragm 96 from engaging the upper limits of the cylinder at the internal shoulder 110 thereof and thereby prevents undue wear on the said diaphragm.

The piston rod or actuator output shaft 102 is slidably bushed in a metal sleeve 112 integral with the lower end of the lower bell housing 14. A pair of nylon bearings 114 and 116 are inserted in the bore 118 of the sleeve 112 to effect a low friction mounting for the said shaft 102. A suitable output coupling means 120 is provided on the lower tip of the output shaft 102, externally of the lower bell housing 14.

The piston 94 is biased inwardly to its uppermost position in the upper bell housing 12 by means of a range spring 122, in the form of a helical compression spring, having one end juxtaposed with the lower inner end wall 124 of the lower bell housing 14 and the other end juxtaposed with the inner top end wall 126 of the piston 94.

The lower limit of piston travel is determined by means of a pair of stops 128 and 130 slidably mounted, respectively, in a pair of vertically and diametrically disposed slots 132 and 134 in the wall of the lower bell housing 14, the said stops extending internally of the said lower bell housing. The stops 128 and 130 are adjustably secured along the slots 132 and 134 by means of set screws 136 and 138, respectively, which cause washers 140 and 142, respectively, to cooperate with the respective stop members 128 and 130 to clamp against the walls of the lower bell housing 14 adjacent the said slots.

Once the stops 128 and 130 have been positioned in the slots 132 and 134, respectively, the lower limit of travel of the piston 94 is set since the lower rim 144 of the said piston will engage the said stops at the said lower limit.

Figure 3:
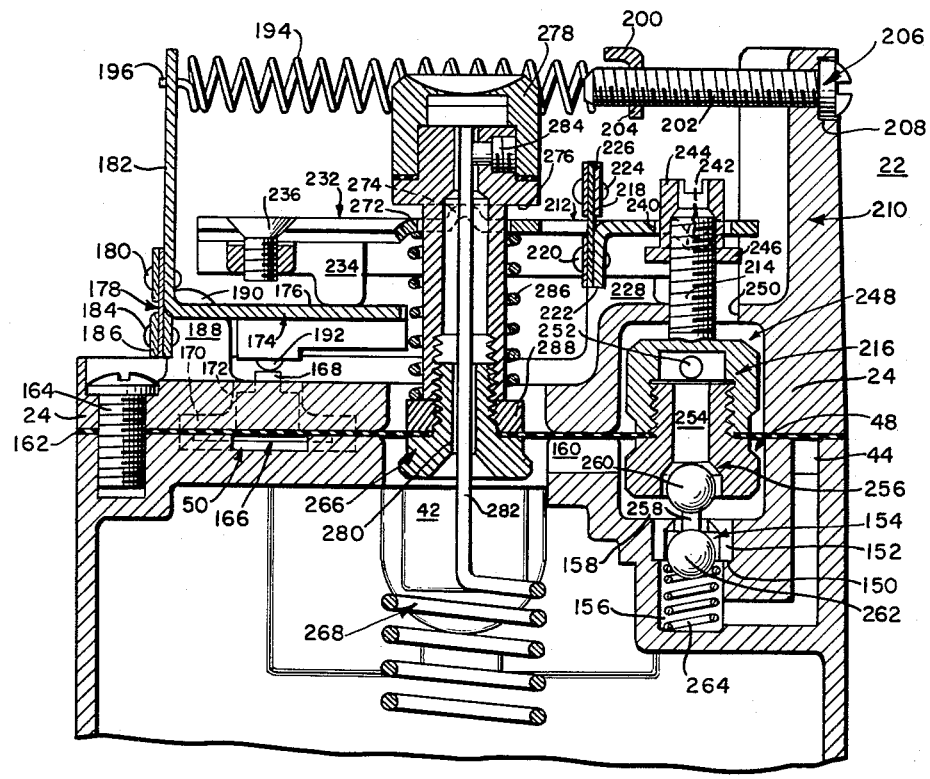
FIGURE 3 is a partial cross-section taken along line 3—3 of FIGURE 1.

Referring now to FIGURES 1, 2 and 3, the pilot relay 22 and its interconnection with the piston actuator 10 will now be described.

The signal pressure for the pilot relay 22 is brought in through the trunnion 58, which is connected to a suitable pressure source (not shown), external signal port 40, and internal transfer port 46 into the double signal chamber 50, in the upper bell housing 12, which chamber is generally shaped like a figure-eight, as shown in top elevation in FIGURE 2.

The main or supply pressure for the pilot relay 22 is brought in through the trunnion 56, which is connected to a suitable pressure source (not shown), external signal port 38, and internal transfer port 44 into the lower or main supply side of the relay valve chamber 48.

Referring specifically to FIGURE 3, the relay valve chamber 48 is shown as being counterbored to provide a stepped cross-section whereby an intermediate shoulder 150 is provided for supportably receiving a removable axially ported sleeve 152 having a counterbored lower end comprising a valve seat 154.

The pressure chamber below the valve seat 154 will be hereinafter referred to as the supply chamber 156 while the pressure chamber above the sleeve 152 and consequently, above the valve seat 154, will be hereinafter referred to as the control chamber 158. The control chamber is directly connected with the main internal pressure port 42 of the piston actuator 10 via an output channel 160 which is also integral with the top of the upper bell housing 12.

A single relay diaphragm 162 extending coextensively with the top of the bell housing 12 serves both as a relay diaphragm for the pilot relay 22 and as a sealing gasket between the bell housing 12 and the pressure plate 24 of the said pilot relay. The diaphragm 162 and pressure plate 24 are held in place on the bell housing 12 by means of a plurality of hold-down screws 164. Thus, the diaphragm 162 defines the upper walls of both the signal chamber 50 and the control chamber 158.

A pair of diaphragm buttons 166, of which one is shown in FIGURE 3, are affixed to the relay diaphragm 162 centrally of each of the portions of the double signal chamber 50. Each of the diaphragm buttons 166 include a vertically extending signal transfer stud 168 which extends through a first expansion chamber 170 and port 172 therefor in the pressure plate 24 to a point above the said pressure plate 24.

Immediately adjacent one end of the pressure plate 24, in the vicinity of the signal transfer studs 168, is a horizontally disposed signal lever 174 having a flat upper bearing surface 176 thereon. The signal lever 174 is mounted on the pressure plate 24 by means of a flexure hinge 178 which is connected by rivets 180 or the like to an integral, vertically extending, extension 182 of the signal lever 174. Thus, as shown in FIGURE 3, the signal lever 174 has an L-shaped cross-section. The other end of the flexure hinge 178 is secured by means of rivets 184 to a cross-bar 186 secured at its ends to integral bosses 188 on the plate 24 by screws 190.

Dependent from the signal lever 174 and abutting with the respective transfer studs 168 on the respective diaphragm buttons 166 is a pair of contact feet 192. The feet 192 are displaced inwardly from the flexure hinge 178 whereby the signal lever 174 will pivot at the said flexure hinge in response to movement of the relay diaphragm 162 and the diaphragm buttons 166 in response to pressure variations in the signal chamber 50.

Adjustable biasing means for holding the contact feet 192 against the transfer studs 168 is provided in the form of a pair of adjustable tension springs 194 extending in mutually parallel and horizontal relationship from end connections 196 on opposite sides of the upper end of the integral signal lever extension 182 to similar, opposite, end connections 198 on a cross bar or yoke member 200. The yoke member 200 is adjustably constrained in space by means of a retaining screw 202 threadably engaged at one end in a bore 204 in the yoke and held by its head end 206 in a counterbored socket 208 in the upper end of an upstanding integral, abutment 210 on the opposite end of the pressure plate 24.

A main control lever 212 is provided which extends substantially coextensively with the signal lever 174 from a position thereabove to a point in space adjacent the upper end of a threaded upper stem portion 214 of an exhaust valve spindle 216 which is mounted on the relay diaphragm 162 centrally of the control chamber 158.

The control lever 212 is pivoted intermediate its ends by means of a second flexure hinge means 218 affixed at one end by rivets 220 to a transverse integral tab 222 on the control lever 212. The other end of the flexure hinge 218 is affixed by rivets 224 to a cross-bar 226 which is secured at its ends to integral bosses 228 on the plate 24 by screws 230.

The portion of the control lever 212 above the signal lever 174 comprises a bifurcated, indexed portion 232 which is adapted to slidably and adjustably support a dependent fulcrum means 234 which engages the flat upper surface 176 of the said signal lever 174. A set screw 236 is provided for adjustably securing the fulcrum means 234 in the central slot portion 238 of the bifurcated section 232 of the control lever 212.

The opposite end of the control lever 212 is provided with a through-port 240 having a pair of diametrically opposed, peripheral, integral, detents 242 extending downwardly below the lower surface of the said control lever. The through-port 240 is adapted to loosely receive a vertically adjustable contact sleeve 244 threadably mounted on the upper stem 214 of the exhaust valve spindle 216. The contact sleeve 244 is provided with an integral peripheral flange 246 which engages the integral detents 242 on the control lever 212.

The exhaust valve spindle 216 is housed above the diaphragm 162 in an exhaust chamber 248 in the pressure plate 24, the said exhaust chamber being open to atmosphere via a port 250 through which the threaded stem 214 of the spindle 216 extends.

A plurality of radial exhaust ports 252, of which only one is shown in FIGURE 3, are present in the spindle 216 within the exhaust chamber 248. The exhaust ports 252 communicate with an axial bore 254 in the spindle 216 which terminates at its lower end, within the control chamber 158, in an exhaust valve seat 256.

A double acting relay valve 258 is provided having an upper valve head 260 for engaging the exhaust valve seat 256 and a lower valve head 262 for engaging the lower valve seat 154 in the supply chamber 156. A coiled, compression, biasing spring 264 is provided in the supply chamber 156 to bias the lower head 262 of the relay valve 258 against the lower valve seat 254.

Referring now to FIGURES 1, 3 and 4, a feedback spindle 266 is mounted through the diaphragm 162 coaxially with the main inlet port 42 of the piston actuator 10. A feedback spring 268, in the form of an elongated tension coil, is connected at one end to the feedback spindle 266 and extends downward, internally of the hollow piston rod 102 to a securing stud 270 located in the lower end of the said piston rod.

The feedback spindle 266 extends upward from the diaphragm 162 and is loosely received in a second through-port 272 in the main control lever 212 immediately adjacent the bifurcated lever portion 232 and on the same side of the second flexure hinge means 218 therewith.

The control lever is provided with a pair of diametrically opposed, integral detents 274 peripherally disposed about the second through-port 272 and extending upwardly above the surface of the control lever 212 into engagement with the lower rim 276 of an enlarged top end-cap assembly 278 on the feedback spindle 266.

The feedback spindle 266 contains an axial bore 280 which receives an elongated integral shank 282 of the feedback spring 268. The top-end cap 278 includes a set screw 284 for retaining the shank 282 in the bore 280.

A coiled, compression, biasing spring 286 is disposed concentrically with the feedback spindle 266 and is compressed axially thereof between an integral shoulder 288 on the spindle 266 and the lower surface of the control lever 212 adjacent the periphery of the second through-port 272, whereby contact between the said feedback spindle and the said control lever is assured.

Operation

Referring to FIGURES 3 and 4 and assuming a position in which the piston 94 of the piston actuator 10 has been constrained in the proper position in proportion to the signal pressure applied to the pilot relay 22, which assumption requires a balanced condition of the pilot relay 22, the operation of the invention will now be described.

In a balanced condition of the pilot relay 22, the force exerted by the feedback spring 268, which is proportional to the position of the piston 94 in terms of its displacement from the fully retracted position of FIGURE 4, via the feedback spindle 266 and the lower rim 276 of its top end-cap 278, on the control lever 212 via the second pair of integral detents 274 thereon, will be balanced out by the opposing force resulting from the action of the signal pressure, which has been applied to the signal chamber 50, on the diaphragm 216, and which has been imparted to the control lever 212 through the diaphragm buttons 166, signal transfer studs 168, contact feet 192 on the signal lever 174, upper surface 176 of the said signal lever and the adjustable fulcrum means 234 on the main control lever 212.

Thus, with the control lever 212 in a balanced state, the left hand or bifurcated end 232 thereof is in equilibrium with respect to the second flexure hinge means 218 and there is no net force applied by the first integral detents 242 on the opposite end of the control lever 212 to the flange 246 on the contact sleeve 244 on the upper stem 214 of the exhaust valve spindle 216. Therefore, the constraint imposed upon the pilot relay 22 and the piston actuator 10 by the signal pressure in the signal chamber 50 is satisfied and the relay valve 258 is in its balanced position with the upper and lower valve heads 260 and 262 seated, respectively, on the exhaust and supply valve seats 256 and 154.

If it is now desired to vary the position of the piston 94 in the piston actuator 10, the magnitude and direction of this variation is directly proportional to the positive or negative variation of the signal pressure in the signal chamber 50 with reference to its initial value.

For example, if it is desired to further displace the piston 94 from its fully retracted position, the signal pressure applied to the trunnion 56 is increased causing the pressure in the signal chamber 50 to increase and impose an increased upwardly directed force, via the fulcrum means 234, to the bifurcated end 232 of the control lever 212. Since this increased upward force will now be greater than the downward force presently exerted on the control lever 212 by the feedback spindle 266, the net result will be a clockwise angular displacement of the control lever 212 about the second flexure hinge means 218.

The clockwise angular displacement of the control lever 212 causes the first integral detents 242 thereon to force the valve spindle 216 downward via the flange 246 of the contact sleeve 244 and thus cause the lower valve head 262 of the relay valve 258 to disengage the supply valve seat 154 and admit more pressure from the supply chamber 156 to the control chamber 158. This will continue until a sufficient increase in pressure has occurred in the piston actuator 10 via the transfer channel 160 and the main inlet 42 therein to force the piston 94 farther away from the shoulder 110 to a position wherein the force of the feedback spring 268 has increased sufficiently to rebalance the control lever 212 via the feedback spindle 266. When this occurs the bias spring 264 in the supply chamber 156 will cause the lower head 262 of the relay valve 258 to reseat on the supply valve seat 154.

Thus, it can now be seen that regardless of the force opposing a change in the displacement of the piston 94, via a load (not shown) connected to the coupling means 120 of the piston actuator 10, the piston displacement will continue to be directly proportional to the signal pressure applied since the balance condition of the relay 22 is a direct function of the force exerted by the feedback spring 268 on the control lever 212 in opposition to the force thereon derived as a direct function of the signal pressure.

A decrease or negative change in signal pressure causes a counterclockwise displacement of the control lever 212 with respect to the second flexure hinge means 218 and, as a result, causes the pressure in the control chamber 158, acting through the diaphragm 162, to lift the exhaust valve spindle 216 and thereby disengage the exhaust seat 256 from the upper valve head 260 of the relay valve 258. This condition continues until the pressure above the piston 94 and in the signal chamber 158 has been sufficiently reduced to permit the piston 94 to be retracted by the return spring 102 to a position in which the force of the feedback spring 268 on the control lever 212 once again is balanced with the force on the said control lever derived from the signal pressure. At this point, the exhaust valve seat 256 is again engaged with the upper valve head 260 of the relay valve 258 and the pilot relay 22 and piston actuator 10 are in a balanced condition.

In order to adjust the range over which the signal pressure must vary to move the piston from the internal shoulder 110 to the stops 128 and 130, it is only necessary to reposition the fulcrum means 234 on the control lever 212 by means of the adjustable range screw 236 in the slot 238 of the bifurcated end 232 of the said control lever 212. Movement to the left in the slot 238, as shown in FIGURES 1 and 3, decreases the range while movement to the right increases the range.

The starting point of the pilot relay 22 and piston actuator 10 is defined as the magnitude of signal pressure at which displacement of the piston 94 from the shoulder 110 commences. This is adjustably determined by means of the adjusting screw 202 and yoke member 200 which varies the bias exerted by the springs 194 on the upward extension 182 of the signal lever 174, causing a selectively variable movement of force to be exerted about the first flexure hinge means 178 by the said signal lever 174 on the signal transfer studs 168 in opposition to the force exerted by the signal pressure in the signal chamber 50 on the diaphragm 162.

As can be seen from the foregoing specification and drawings, this invention provides a novel pilot relay and a novel piston actuator combined in a novel integral fluid motor and control arrangement which is adapted to produce an output displacement directly proportional to the magnitude of a pressure signal input irrespective of the external load applied to the piston actuator.

It is to be understood that the specific embodiment of the invention shown and described herein is for the purpose of example only and is not intended to limit the scope of the appended claims.

What is claimed is:

1. A pilot controlled piston actuator including a cylinder, a displaceable piston means in said cylinder and a pilot relay adapted to supply actuating pressure to said cylinder from a source of supply pressure in response to a signal pressure to thereby displace said piston in said cylinder in an amount proportional to the magnitude of said signal pressure, said relay comprising signal responsive means, pressure modulating means, control means interconnecting said signal responsive means and said pressure modulating means and feedback means interconnecting said control means and said piston means; wherein said control means comprising a control lever pivoted intermediate its ends, said lever being connected on one end with said pressure modulating means and on the other end with said signal responsive means, said other end comprising range adjusting means for varying the response of said control lever to a displacement of said signal responsive means.

2. A pilot controlled piston actuator including a cylinder, a displaceable piston means in said cylinder and a pilot relay adapted to supply actuating pressure to said cylinder from a source of supply pressure in response to a signal pressure to thereby displace said piston in said cylinder in an amount proportional to the magnitude of said signal pressure, said relay comprising signal responsive means, pressure modulating means, control means interconnecting said signal responsive means and said pressure modulating means and feedback means interconnecting said control means and said piston means; wherein said signal responsive means comprises a signal chamber for receiving signal pressure, a flexible diaphragm defining one wall of said signal chamber, transfer means on said diaphragm for transmitting a displacement thereof in response to variations in said signal pressure, and a signal lever having pivot means at one end thereof interconnecting said transfer means with said control means.

3. The invention defined in claim 2, wherein said signal responsive means further includes bias means on said signal lever for selectively imposing a force on said signal lever in opposition to the action of said signal pressure on said diaphragm imparted to said signal lever by said transfer means.

4. A pilot controlled piston actuator including a cylinder, a displaceable piston means in said cylinder and a pilot relay adapted to supply actuating pressure to said cylinder from a source of supply pressure in response to a signal pressure to thereby displace said piston in said cylinder in an amount proportional to the magnitude of said signal pressure, said relay comprising signal responsive means, pressure modulating means, control means interconnecting said signal responsive means and said pressure modulating means and feedback means interconnecting said control means and said piston means; wherein said signal responsive means comprises a signal chamber for receiving signal pressure, a flexible diaphragm defining one wall of said signal chamber, transfer means on said diaphragm for transmitting a displacement thereof in response to variations in said signal pressure, and a signal lever having pivot means at one end thereof interconnecting said transfer means with said control means; and wherein said control means comprises a control lever pivoted intermediate its ends, said lever being connected on one end with said pressure modulating means and on the other end with said signal responsive means, said other end comprising range adjusting means for varying response of said control lever to a displacement of said signal responsive means.

5. The invention defined in claim 4, wherein said range adjusting means comprises a bifurcated end portion on said control lever defining a slot therein substantially coextensive with said signal lever and fulcrum means mounted on said bifurcated end portion and adjustably slidable the length of said slot, said fulcrum being engaged with the said signal lever.

6. A pilot controlled piston actuator including a cylinder, a displaceable piston means in said cylinder and a pilot relay adapted to supply actuating pressure to said cylinder from a source of supply pressure in response to a signal pressure to thereby displace said piston in said cylinder in an amount proportional to the magnitude of said signal pressure, said relay comprising signal responsive means, pressure modulating means, control means interconnecting said signal responsive means and said pressure modulating means and feedback means interconnecting said control means and said piston means; wherein said signal responsive means comprises a signal chamber for receiving signal pressure, a flexible diaphragm defining one wall of said signal chamber, transfer means on said diaphragm for transmitting a displacement thereof in response to variations in said signal pressure, and a signal lever having pivot means at one end thereof interconnecting said transfer means with said control means; and wherein said control means comprises a control lever pivoted intermediate its ends, said lever connected on one end with said pressure modulating means and on the other end with said signal responsive means, said other end comprising range adjusting means for varying the response of said control lever to a displacement of said signal responsive means; and further wherein said feedback means includes flexible tension means interconnected with said control lever adjacent said range adjusting means for imparting a variable force to said control lever in opposition to the force exerted thereon by said signal lever.

7. The invention defined in claim 6, wherein said range adjusting means comprises a bifurcated end portion on said control lever defining a slot therein substantially coextensive with said signal lever and fulcrum means mounted on said bifurcated end portion and adjustably slidable the length of said slot, said fulcrum being engaged with the said signal lever.

References Cited in the file of this patent

UNITED STATES PATENTS

| | | |
|---|---|---|
| 2,125,949 | O'Conner | Aug. 9, 1938 |
| 2,280,345 | Nickells | Apr. 21, 1942 |
| 2,652,066 | Bowditch | Sept. 15, 1953 |
| 2,808,725 | Booth et al. | Oct. 8, 1957 |
| 2,816,562 | Dyson | Dec. 17, 1957 |
| 2,827,020 | Cook | Mar. 18, 1958 |
| 2,934,305 | Farris et al. | Apr. 26, 1960 |
| 2,936,584 | Porter et al. | May 17, 1960 |
| 2,966,891 | Williams | Jan. 3, 1961 |
| 3,087,468 | Roberts et al. | Apr. 30, 1963 |

UNITED STATES PATENT OFFICE
CERTIFICATE OF CORRECTION

Patent No. 3,172,336

March 9, 1965

Harold E. Warstler

It is hereby certified that error appears in the above numbered patent requiring correction and that the said Letters Patent should read as corrected below.

Column 7, line 13, for "comprising" read -- comprises --.

Signed and sealed this 3rd day of August 1965.

(SEAL)
Attest:

ERNEST W. SWIDER
Attesting Officer

EDWARD J. BRENNER
Commissioner of Patents